W. L. PIPKIN.
PULLEY.
APPLICATION FILED JULY 15, 1910.

992,901.

Patented May 23, 1911.

Witnesses:
A. A. Olson
W. E. Smith

Inventor:
William L. Pipkin
by Joshua R. H. Potts
his Attorney.

UNITED STATES PATENT OFFICE.

WILLIAM LOUIS PIPKIN, OF CHICAGO, ILLINOIS.

PULLEY.

992,901. Specification of Letters Patent. Patented May 23, 1911.

Application filed July 15, 1910. Serial No. 572,113.

*To all whom it may concern:*

Be it known that I, WILLIAM L. PIPKIN, a citizen of the United States, residing at Chicago, county of Cook, and State of Illinois, have invented certain new and useful Improvements in Pulleys, of which the following is a specification.

My invention relates to improvements in friction pulleys and more specifically to that class thereof designed for use especially in conjunction with dental engines.

The object of my invention is the provision of a pulley of the character mentioned which will be of durable and economical construction and efficient in operation.

Other objects will appear hereinafter.

With these objects in view my invention consists in a friction pulley characterized as above mentioned and in certain details of construction and arrangement of parts all as will be hereinafter fully described and particularly pointed out in the appended claim.

Figure 1:
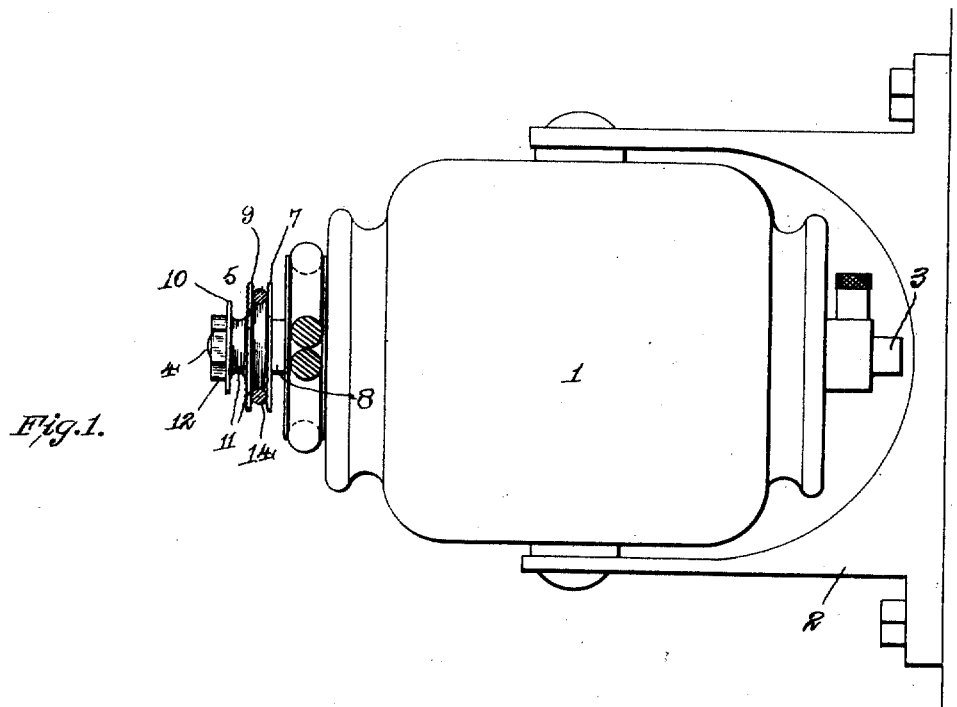
Figure 3:
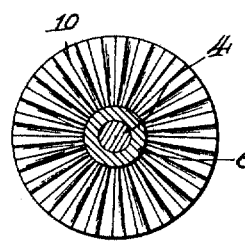
Figure 2:
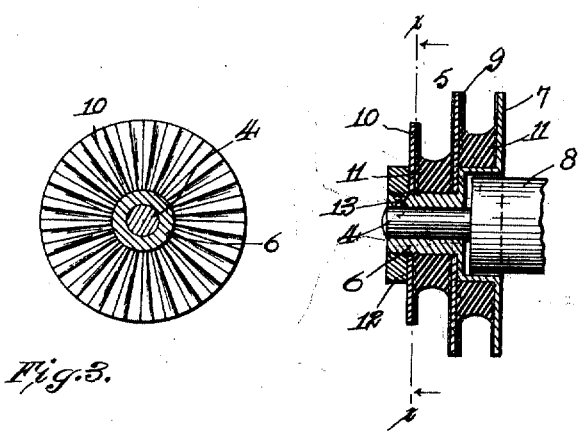

My invention will be more readily understood by reference to the accompanying drawing forming a part of this specification and in which, Figure 1 is a side elevation of an ordinary electric dental engine to the power shaft of which is applied a pulley embodying the preferred form of my invention, Fig. 2 is an enlarged fragmentary side elevation of the end portion of the engine housing and the power shaft of the engine upon which is mounted my improved pulley, the latter being shown in section, and Fig. 3 is a section on line $x$—$x$ of Fig. 2.

Referring now to the drawing 1 indicates an electric dental engine which may be of any ordinary or preferred design, the same being shown mounted in a bracket 2 for horizontal oscillation, as is usual.

3 indicates the power shaft of said engine upon the outer extremity 4 of which is mounted pulley 5 in which is embodied my invention. Said pulley comprises a metallic body portion which consists of an inner tubular portion or hub 6 and a circumferential outwardly extending flange 7 formed at and integral with the inner extremity of said hub. The inner end portion of the hub 6 is enlarged in order to accommodate the outer end of the bearing 8 of the power shaft. Loosely mounted upon the hub 6 are flanges 9 and 10, the former being of an outer diameter the same as that of the flange 7, the latter being of slightly less diameter. Interposed between the flanges 7 and 9, and 9 and 10 are loosely mounted rings 11 of a suitable frictional material such as fiber, leather, rubber, or the like, said rings being as indicated of different diameters, the peripheries thereof being concaved in form in order to better accommodate the rope belt 14 which travels thereover. Said rings, together with the flanges 9 and 10, are securely held in position upon the hub 6 by means of a nut 12 threaded upon the latter and which serves to clamp said parts between the same and the stationary flange 7. The inner surfaces of the flanges 7 and 10 and both sides of the flange 9 are radially serrated or toothed, as indicated, in order to increase the frictional engagement thereof with the friction rings 11 and to thereby preclude any possibility of slipping of said rings between said flanges.

The pulley is locked in position upon the shaft 3 by means of a set screw 13 threaded into hub 6, the head thereof being countersunk in the latter. Said screw it will be observed is positioned in the hub directly under the nut 12 so that screwing or unscrewing of the former in order to effect locking or unlocking of the pulley may be effected by simply unscrewing and removing said nut.

A pulley of the construction set forth presents bearing surfaces of a frictional character so that the slippage of a belt thereon is prevented. Said bearing surfaces are formed of the rings 11 which are detachably secured upon the hub in a manner as before described, so that upon becoming worn or otherwise disabled, the same may be readily removed and replaced by new ones. The pulley is of simple construction hence may be manufactured at a low cost, and the same is of highest efficiency in operation.

While I have shown what I deem to be the preferable form of my pulley, I do not wish to be limited thereto as there might be various changes made in the details of construction and the arrangement of parts described without departing from the spirit of the invention comprehended within the scope of the appended claim. And though I have designed my pulley with special reference to use in conjunction with dental engines the same may be employed in conjunction with any other device to which it is applicable.

Having described my invention what I claim as new and desire to secure by Letters Patent is:

The combination with a shaft having a central stud at its outer end, of a pulley removably secured to said shaft, said pulley comprising a central metallic hub provided with a central bore, the outer portion of said bore fitting said stud and the inner portion of said bore being enlarged to fit said shaft, there being an integral flange at the inner end of said hub; loose flanges on said hub; friction rings between said flanges; and a nut threaded on said stud and bearing against the outermost loose flange, substantially as described.

In testimony whereof I have signed my name to this specification in the presence of two subscribing witnesses.

WILLIAM LOUIS PIPKIN.

Witnesses:
HELEN F. LILLIS,
JOSHUA R. H. POTTS.